Feb. 13, 1968    L. O. STORLIE ETAL    3,368,836
JOINT CONSTRUCTION INCLUDING CONNECTOR
Filed Sept. 27, 1965
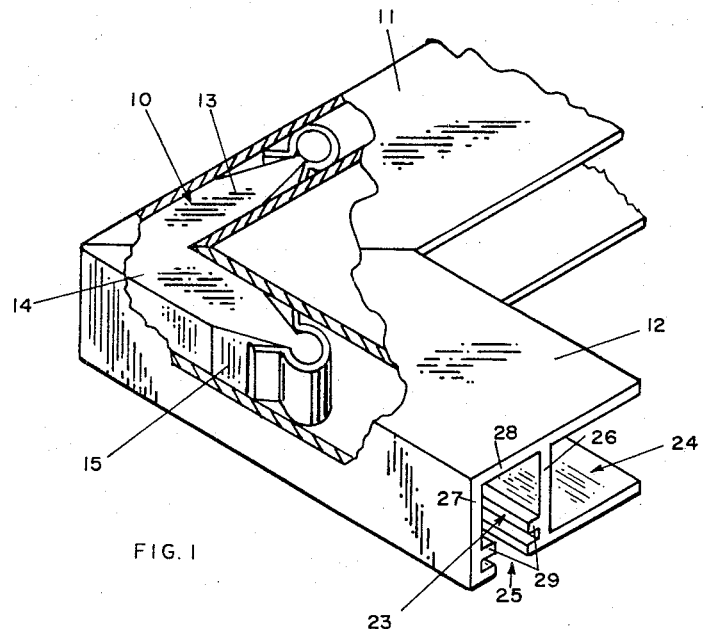
FIG. 1
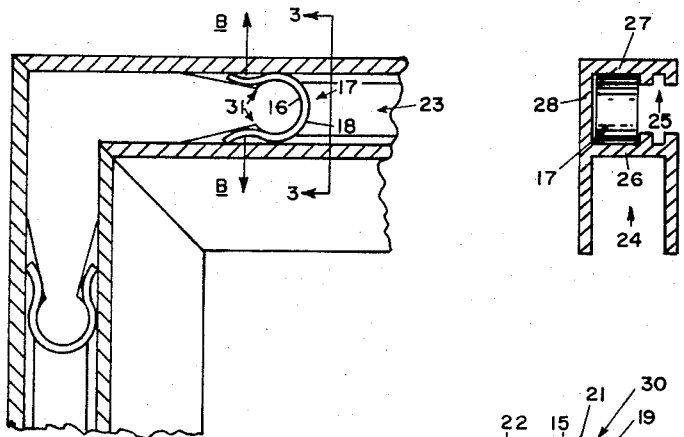
FIG. 2
FIG. 3
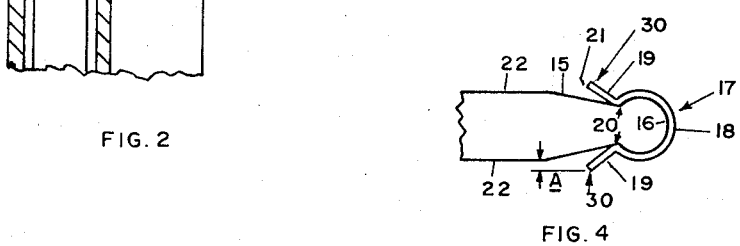
FIG. 4
INVENTOR.
LLEWELLYN O. STORLIE
LYLE M. NORTHRUP
BY
*Richard J. Lenk*
ATTORNEY

United States Patent Office 3,368,836
Patented Feb. 13, 1968

3,368,836
JOINT CONSTRUCTION INCLUDING CONNECTOR
Llewellyn O. Storlie and Lyle M. Northrup, Decorah, Iowa, assignors to Deco Products Company, Decorah, Iowa
Filed Sept. 27, 1965, Ser. No. 490,533
4 Claims. (Cl. 287—189.36)

ABSTRACT OF THE DISCLOSURE

Channels or tubular members such as used in aluminum windows and door frames may be joined together by connectors which telescope into channels or grooves of the members. A locking action is provided by removable spring clips on the ends of the connector which allow easy insertion of the connector ends but provide a barb effect to prevent easy withdrawal. However, with sufficient retrogressive force against the connector, the clips will release from the connector ends to allow the tubular members to be separated for replacement of glass, etc.

---

The present invention relates to connectors, and more particularly to self-locking connectors adapted to secure grooved, channel or tubular members together.

While the invention is not limited in its application, it has particular utility in the framing of miter joints in metal windows and doors using extruded grooved or tubular members.

In the past, many types of such self-locking connectors have been proposed but they have been generally inadequate because, among other things, they did not provide rigid and tight joints, did not permit easy replacement of glass, and required extensive labor and equipment.

It is therefore a primary object of the invention to provide a self-locking connector for forming a rigid and tight joint between tubular, grooved, extruded and/or channel members.

A further object of the invention resides in a self-locking assembly which requires minimum assembly equipment and labor.

A still further object of the invention is to provide a self-locking assembly which may be easily disassembled for glass and panel replacement.

Further objects of the invention will become apparent from the following description when taken in conjunction with the accompanying drawings wherein:

FIG. 1 is a perspective view, partially in section, of one form of the self-locking connector of the invention shown securing mitered channel sections.

FIG. 2 is a sectioned plan view of the assembly shown in FIG. 1.

FIG. 3 is a sectional view taken substantially along lines 3—3 of FIG. 2, and

FIG. 4 is a plan view of one end of the connector before installation.

With reference now to FIG. 1 of the drawings, the self-locking connector is shown at 10 securing two mitered frame members 11 and 12.

In this embodiment, the connector 10 has two arms 13 and 14 at right angles to one another. The body portions of the arms are of rectangular cross section for a purpose to be discussed later. Toward their outer ends, a pair of opposed sides of the arms 13 and 14 taper inwardly to a reduced cross-section 15 and then flare outwardly to form a cylindrical knob 16.

For the purpose of forming a lock between the channels 11–12 and the connector 10, spring clips 17 are provided on the connector knobs 16. Specifically, clips 17 are formed from relatively flat spring steel and have a partially enclosed or looped end 18 having free legs 19 bent sharply outwardly as at 20 (FIG. 4).

Looped end 18 is formed substantially the same size as the connector knob 17 so as to fit thereon under spring tension. In practice, the looped end 18 has an arc greater than 180° so that the inner edge of the sharp bend 20 locks around the knob. In other words, the distance across the bend corners 20 is less than the maximum transverse distance across the loop 18 so as to provide a detent holding action.

Free legs 19 of spring clip 17 as shown in FIG. 4 are bent at a greater angle than the arm taper 15 so as to diverge outwardly therefrom. The legs are also bent to define an acute included angle between them to allow easy insertion in one direction. Thus, under the resiliency of the clips, the extreme ends 21 thereof extend outwardly of the connector sides 22 as indicated at A (FIG. 4) before the assembly is inserted into a channel or grooved frame member.

The frame members 11 and 12 are merely representative of types commonly used and the invention is not limited to their specific shapes. However, in the present instance they have a channel 23 in which the connector assembly is inserted, a glass or panel channel 24, and a weatherstrip channel 25.

Channel 23, the only one concerned with the present invention, includes two opposed end walls 26 and 27 joined by a web or side wall 28. Short flanges 29 form a fourth or guide wall opposite the web 28.

In assembly, one arm of the connector 10 is inserted into the channel 23 of one of the frame members 11 or 12 with the looped end 18 of the spring clip leading. The second frame member is then telescoped over the opposite connector arm and the two channels pressed together in tight contact.

During insertion, the free legs 19 of the clips are deformed and deflected toward the tapered portion 15 of the arm thereby allowing the clips (and arms) to slide into the channels 23 easily. To facilitate entry, the reduced cross sectional area 15 of the connector is tapered sufficiently to be spaced apart from the side walls 26 and 27 a distance at least as great as the thickness of the metal clips so as not to cause a heavy binding action.

Now, when an attempt is made to pull the frame members apart, the end edges 30 of the clip legs 19 act in the nature of tangs or barbs and bite into the walls 26 and 27 to prevent withdrawal. At the same time, the sharp bend corners 20 of the clips are forced into close contact with the knob 16 at the reduced area 31 thereof (FIG. 2). This serves to lock the clip on the connector and thus lock the frame members 11 and 12 from movement with respect to one another when forces are applied during normal handling and use.

According to another feature of the invention, in the event of glass breakage or the desire to disassemble, the frame members 11 and 12 can be conveniently released from the connector. This is accomplished by striking a lateral blow to a frame member with a suitable block or mallet. With sufficient force, the knob end 16 of the connector will slide past the necked-down area of the clips between points 20, deflecting such points outwardly in the direction B in FIG. 2. Knob 16 then slides out of the clip, the latter being retained in the channel by the biting action of the end edges 30.

The frame members 11 and 12 may then be re-assembled by placing another spring clip 17 on the free end of the connector and inserting as described hereinabove. Upon re-insertion of the assembly, the spring clip remaining in the channel 23 is merely forced farther into the channel. To prevent cocking and turning of the frame members, the cross sectional area of the body portion of the arm 13 and 14 is generally the same as that of the grooves, channels or tubes into which they are inserted.

While in the embodiment shown the channel 23 has the equivalent of four confining sides, it will be appreciated that the concepts of the invention may be employed with three sided channels or grooves of differing configurations. Likewise, the clip 17 is not necessarily limited to a flat material with rectangular cross sectional shapes although such clips do provide greater bearing or contact surface as compared to "pin-point" contact. In the same sense, while the connector knobs 16 have been shown cylindrical, they could take on other shapes such as hexagonal etc., or be undercut to form a receiving notch complementary to the detent action of the clips.

As a specific example of a clip and connector which has been found to work very satisfactorily, the knob on the connector has a 5/32" diameter as does the inside of the spring clip; the latter being made of .018" material 5/32" wide. The clip legs extend downwardly and outwardly from the bend 20 a distance of approximately 3/32" parallel to radii of the knob with an included angle between them of between 60° to 80°.

It will thus be appreciated that the present invention provides a means of easy assembly with a minimum of skill and tooling by eliminating unsightly bolt and nuts, staking, drilling, welding, and other types of fastening methods. The invention is, of course, not limited to mitered joints but may be used in splicing of frame sections and in the hanging or mounting of individual frame members. In such case the connector arm may be straight or have arms at other angular dispositions.

Of course, various other changes may be made in the detailed construction and arrangement of parts within the concept of the invention without departing from the scope of the following claims.

What we claim is:

1. A joint construction comprising,
   (a) a framing member having a groove formed therein defined by a wall area,
   (b) a connector for said framing member,
   (c) said connector having a reduced portion and a knob portion adjacent said reduced portion,
   (d) a clip detachably carried on said knob portion,
   (e) said clip having a partially closed loop section and necked-down area from which outwardly flared legs extend,
   (f) said loop section being somewhat complementary to said knob portion on said connector so as to be received thereon with the necked-down area of said clip being received on the reduced portion of said connector adjacent said knob,
   (g) said connector and said clip being insertably received in the groove of said framing member and said flared clip legs providing a barb effect engaging said wall area of said groove to prevent easy withdrawal of said connector from said groove.

2. A joint construction as claimed in claim 1 wherein the loop section of said clip encompasses an arc greater than 180°.

3. A joint construction as claimed in claim 1 wherein said clip has a relatively flat and thin transverse cross-section.

4. A joint construction as claimed in claim 1 wherein the legs of said clip define an acute angle between them.

References Cited

UNITED STATES PATENTS

| 2,117,832 | 5/1938 | Wellner | 85—23 |
| 3,163,264 | 12/1964 | Gondry | 287—189.36 |
| 3,230,652 | 1/1966 | McNair | 287—189.36 |

FOREIGN PATENTS 570,357     1958    Belgium.

CARL W. TOMLIN, *Primary Examiner.*

R. S. BRITTS, *Assistant Examiner.*